United States Patent
Zung et al.

(10) Patent No.: US 7,826,148 B2
(45) Date of Patent: Nov. 2, 2010

(54) ASPHERIC LENS STRUCTURES AND FABRICATION METHODS THEREOF

(75) Inventors: Pai-Chun Peter Zung, Hsinchu (TW); Shin-Chang Shiung, Taichung (TW); Wei-Ko Wang, Taoyuan (TW); Chia-Yang Chang, Hsinchu (TW); Chien-Pang Lin, Hsinchu (TW)

(73) Assignee: VisEra Technologies Company Limited, Hsinchu (TW)

( * ) Notice: Subject to any disclaimer, the term of this patent is extended or adjusted under 35 U.S.C. 154(b) by 543 days.

(21) Appl. No.: 11/706,192

(22) Filed: Feb. 15, 2007

(65) Prior Publication Data

US 2008/0198481 A1    Aug. 21, 2008

(51) Int. Cl.
G02B 13/18 (2006.01)
G02B 3/02 (2006.01)
G02B 3/00 (2006.01)
G02B 9/00 (2006.01)

(52) U.S. Cl. .................... 359/708; 359/717; 359/664
(58) Field of Classification Search ................ 359/708, 359/716, 717, 664, 738–740, 619, 620, 626
See application file for complete search history.

(56) References Cited

U.S. PATENT DOCUMENTS

| | | | | |
|---|---|---|---|---|
| 4,537,473 A | * | 8/1985 | Maschmeyer | 359/708 |
| 4,641,929 A | * | 2/1987 | Braat | 359/719 |
| 4,890,905 A | * | 1/1990 | Van Rosmalen et al. | 359/708 |
| 5,004,330 A | * | 4/1991 | Ishibai et al. | 359/708 |
| 6,049,430 A | | 4/2000 | Heanue et al. | |
| 2002/0135883 A1 | * | 9/2002 | Nishikawa et al. | 359/619 |

FOREIGN PATENT DOCUMENTS

JP       60-57801      4/1985

* cited by examiner

*Primary Examiner*—Alicia M Harrington
(74) *Attorney, Agent, or Firm*—Muncy, Geissler, Olds & Lowe, PLLC

(57) ABSTRACT

Aspheric lens structures with dual aspheric surfaces and fabrication methods thereof are disclosed. An aspheric lens structure includes a first lens component with an aspheric top surface disposed on a second lens component, wherein the interface between the first lens component and the second lens component is spherical. The second lens component includes an aspheric back surface, wherein the radius of curvature of the aspheric top surface of the first lens component is different than the radius of curvature of the aspheric back surface of the second lens component. The second lens component may also include a planar back surface with a third lens component disposed on the planar back surface of the second component. The third lens component includes an aspheric back surface, wherein the radius of curvature of the aspheric top surface of the first lens component is different than the radius of curvature of the aspheric back surface of the third lens component.

17 Claims, 7 Drawing Sheets

ASPHERIC LENS STRUCTURES AND FABRICATION METHODS THEREOF

BACKGROUND OF THE INVENTION

1. Field of the Invention

The invention relates to aspheric lens structures, and more particularly to lens structures with dual aspheric surfaces and fabrication methods thereof.

2. Description of the Related Art

Digital cameras utilizing high-resolution electronic imaging sensors typically require high resolution optical components such as aspheric lenses. Aspheric lenses have some optical advantages, but cannot be easily produced by traditional glass grinding and polishing techniques. Aspheric lenses with all glass elements may be large and excessively expensive for use in compact digital cameras or accessories built into a cellular phone.

Aspheric elements are typically produced by molding plastics or low melt temperature glasses. While molded plastic elements are inexpensive to produce, the level of precision of the lenses is not always sufficient for high-resolution cameras, particularly if a plastic element is used primarily as a focusing element. Further, a conventional aspheric lens with a single aspheric surface is produced by molding a resin on a plate and is then replicated to create an array of aspheric lens on the plate for wafer level package application. The ability to mass produces molding lenses is limited, thus, manufacture thereof is expensive.

FIG. 1 is a schematic view of conventional aspheric lens fabricated by molding. In FIG. 1, a transparent resin 3 is injected on a plate 1. A die 2 moves toward the substrate to mold the transparent resin 3 into a lens with an aspheric surface 3a on the plate 1, the die then returns to its original position. An array of aspheric lens 3 on the plate 1 is replicated by repeating the described molding procedure for wafer level package application.

FIG. 2 is a schematic view of another conventional hybrid aspheric lens fabricated by transferring an aspheric composite layer on a convex lens. Referring to FIG. 2, conventional hybrid lenses, in which an aspheric composite layer is formed on a single lens of optical glass or lens plate serving as a parent material, are commercially practical as a means for forming an aspheric lens at relatively low cost. The forming die 10 has a smoothed concave transfer face 20 for forming an aspheric composite layer 30 thereon. After a predetermined amount of ultraviolet-curing resin 30, which is the material of the aspheric composite layer, is poured on the transfer face 20, a convex lens 40 made of optical glass is placed on and fixed to the forming die 10 via a support frame 50. The ultraviolet-curing resin 30 thereby fills the entire space between the transfer face 20 and the convex lens 40. The ability to mass produce aspheric composite layer transferred to a convex lens is limited and thus expensive to manufacture.

BRIEF SUMMARY OF THE INVENTION

The invention is directed to aspheric lens structures with dual aspheric surfaces fabricated by lithography. Optical performance can be improved in comparison to single aspheric surface lens plates.

The invention provides an aspheric lens structure comprising a first lens component with an aspheric top surface disposed on a second lens component, wherein the interface between the first lens component and the second lens component is spherical.

In an aspect of the invention, the second lens component comprises an aspheric back surface, wherein the radius of curvature of the aspheric top surface of the first lens component is different than the radius of curvature of the aspheric back surface of the second lens component.

In another aspect of the invention, the second lens component comprises a planar back surface and a third lens component is disposed on the planar back surface of the second component. The third lens component comprises an aspheric back surface, wherein the radius of curvature of the aspheric top surface of the first lens component is different than the radius of curvature of the aspheric back surface of the third lens component.

The invention further provides a method for fabricating an aspheric lens structure, comprising providing a substrate, perforating the substrate with a hole, inserting a ball lens in the hole exposing a pre-curvature of the ball lens, applying a layer of black dye on the substrate to obstruct an unnecessary part of the ball lens, conformably forming a photoresist layer on the substrate and the exposed ball lens, and forming the photoresist layer by lithography to create an aspheric surface on the ball lens configured as a first lens component.

In an aspect of the invention, the method for fabricating an aspheric lens structure, further comprises polishing the back of the ball lens to create a planar back surface configured as a second lens component, and forming a third lens component with an aspheric back surface on the planar back surface of the second component.

In another aspect of the invention, the method for fabricating an aspheric lens structure further comprises removing the ball lens, creating a cavity, and forming a second lens component with an aspheric back surface in the cavity.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
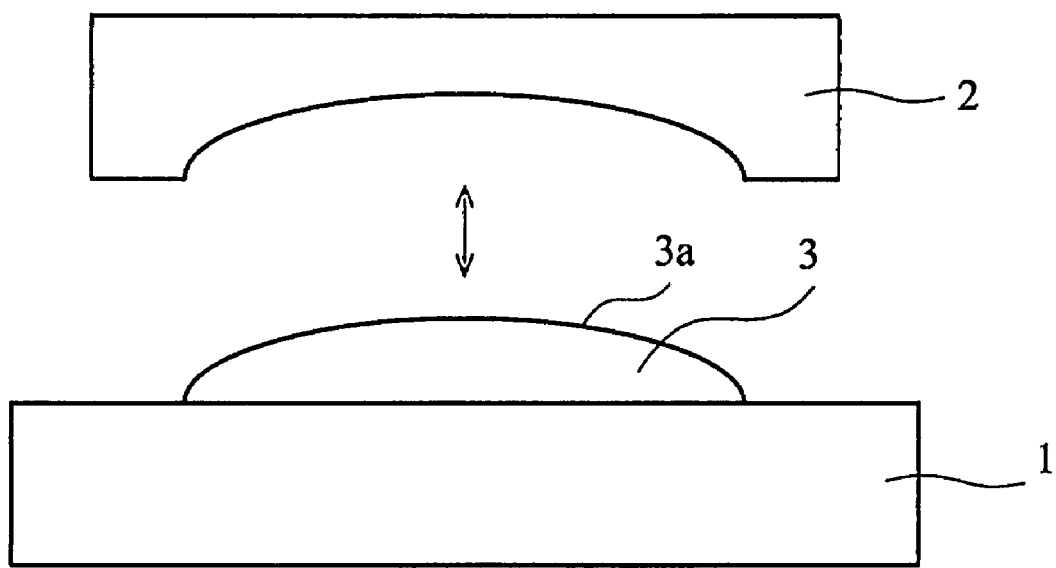
FIG. 1 is a schematic view of conventional aspheric lens fabricated by molding.
Figure 2:
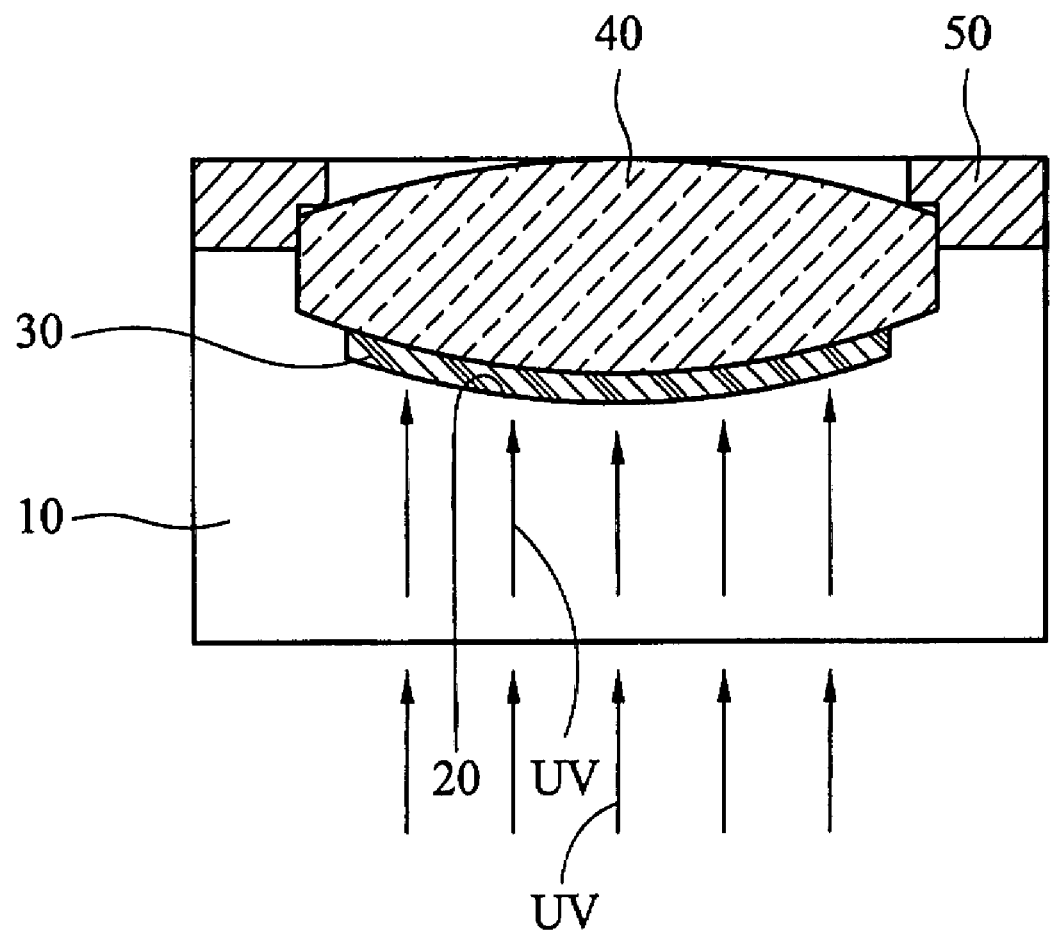
FIG. 2 is a schematic view of another conventional hybrid aspheric lens fabricated by transferring an aspheric composite layer to a convex lens.
Figure 3:
FIGS. 3-10 show cross sections illustrating fabrication of an exemplary embodiment of an aspheric lens structure with dual aspheric surfaces of the invention.

FIGS. 3-10 show cross sections illustrating fabrication of an exemplary embodiment of an aspheric lens structure with dual aspheric surfaces of the invention. Referring to FIG. 1, a substrate 100 is provided. Substrate 100 comprises a bulk silicon substrate, a quartz substrate or a glass substructure. Substrate 100 is configured as a carrier of the aspheric lens structure.

Figure 4:
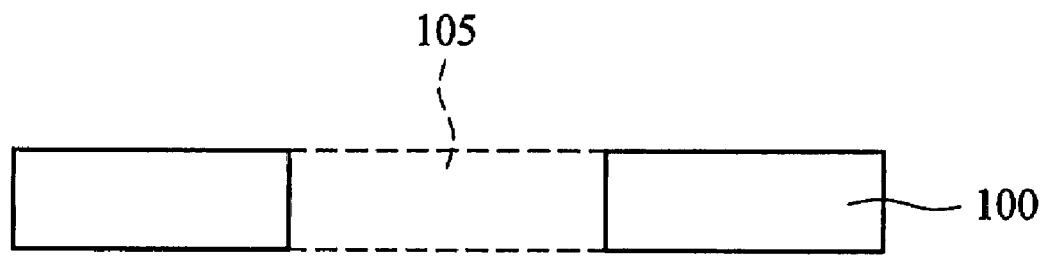
Figure 5:
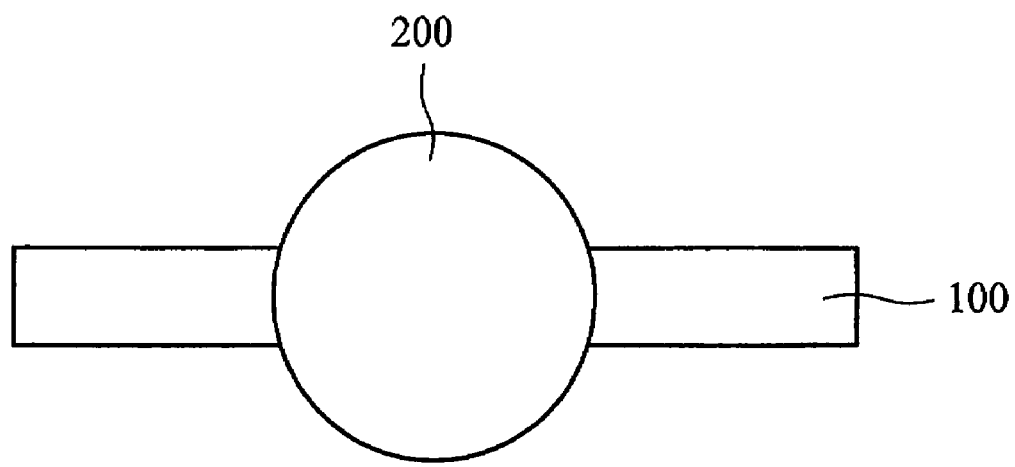

Referring to FIG. 4, the substrate 100 is perforated to create a through hole 105. The diameter of the through hole 105 is equal to or less than the diameter of a yet to be described ball lens. A ball lens 200 is inserted in the through hole 105 exposing a pre-curvature of the ball lens 200, as shown in FIG. 5.

Figure 6:
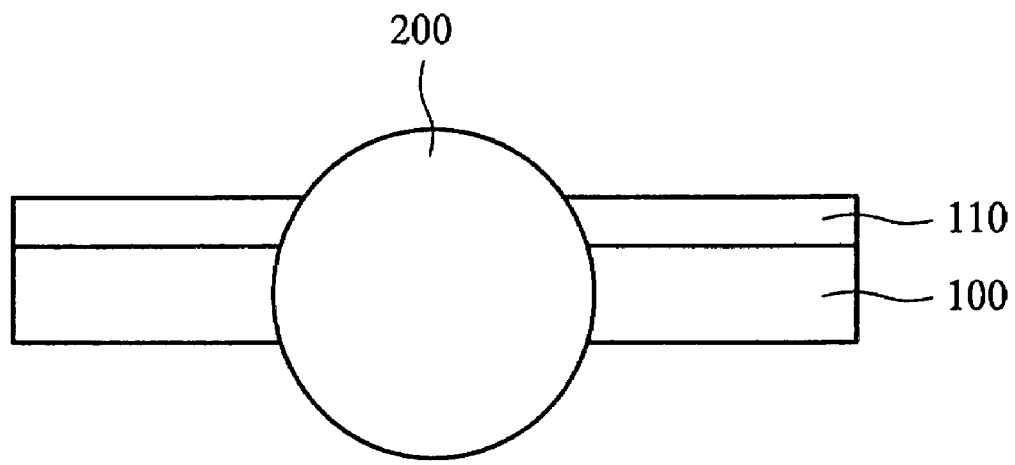

Referring to FIG. 6, a layer of black dye 110 is applied to the substrate for obstructing an unnecessary part of the ball lens 200. The layer of black dye 110 is preferably formed by coating on the substrate 100 configured as a buffer for the aspheric lens structure.

Figure 7:
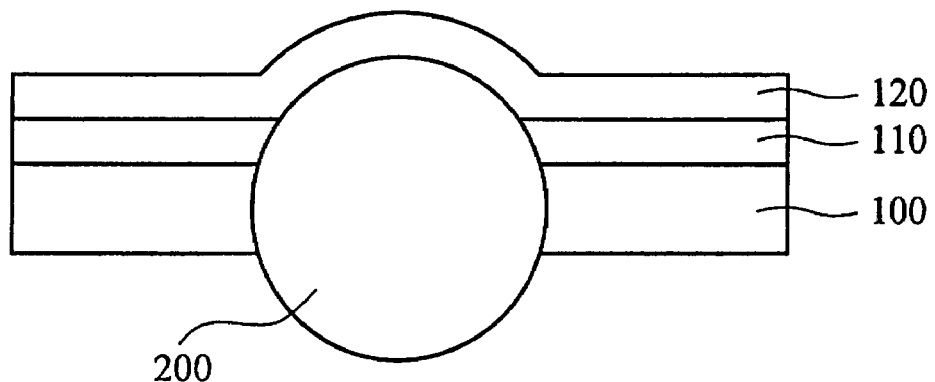
Figure 8:
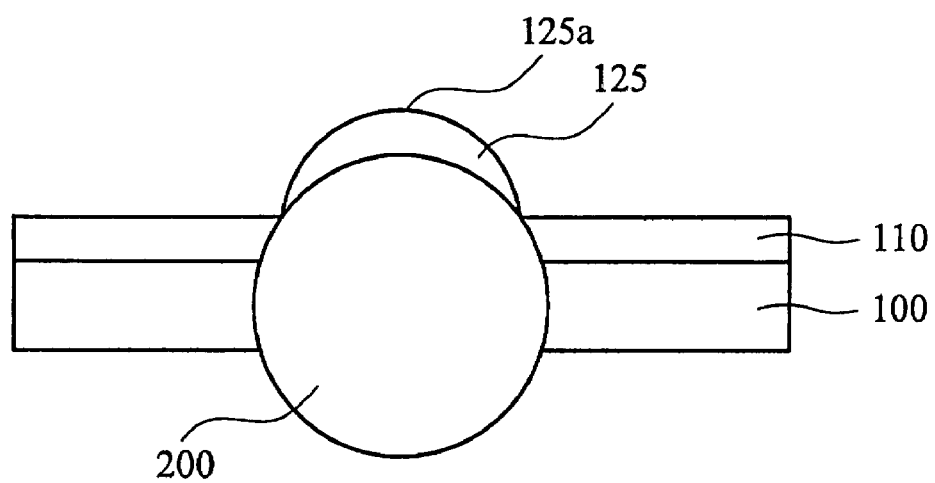

Referring to FIG. 7, a photoresist layer 120 is conformably formed on the black dye layer 110 and the exposed ball lens 200. A mask 300 such as a phase transition mask is disposed over the main region corresponding to the aspheric lens. The phase transition mask includes a half tone mask or a gray tone mask. An aspheric lens component 125 with an aspheric surface 125a is formed on the ball lens 200 by forming a photoresist layer by lithography to serve as a first lens component as depicted in FIG. 8. The ball lens 200 is configured as a second lens component with a spherical back surface.

The preferable aspheric lens component 125 can optionally be heated and reflowed to change the radius of curvature of the aspheric surface 125a. Further, the aspheric lens component 125 can optionally be molded to change the curvature of the aspheric surface 125a.

Figure 9:
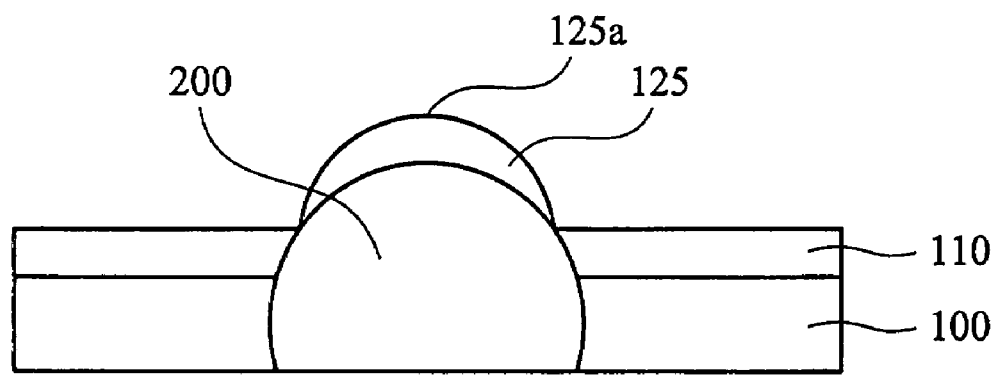
Figure 10:
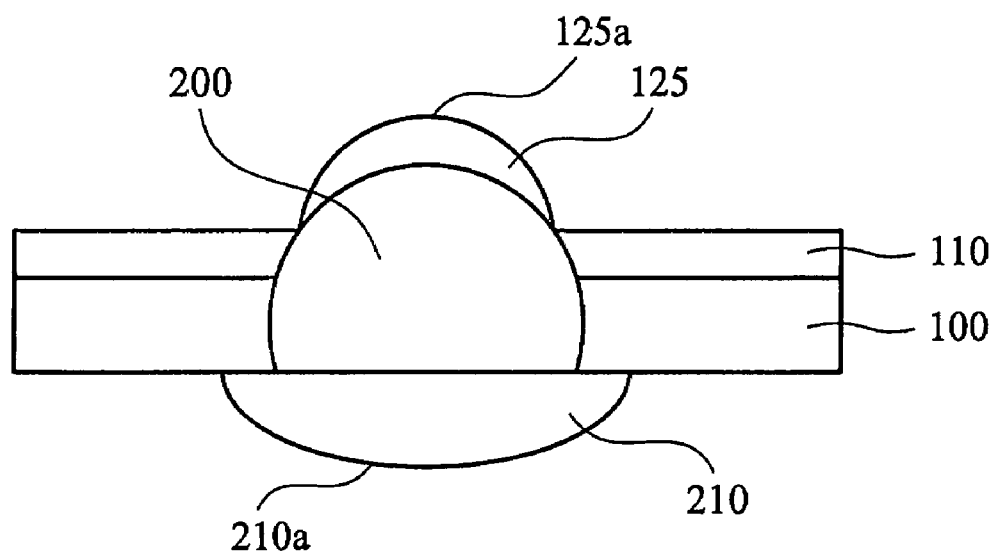

Referring to FIG. 9, the back of the ball lens 200 is planarized to create a planar back surface. For example, chemical mechanical planarization (CMP) is performed to remove the convex back portion of the ball lens 200. A third lens component 210 with an aspheric back surface 210a is subsequently formed on the planar back surface of the ball lens 200, as depicted in FIG. 10. The third lens component 210 can be formed by molding. The radius of curvature of the aspheric top surface 125a of the first lens component 125 is different than the radius of curvature of the aspheric back surface 210a of the third lens component 210.

An array of aspheric lens structures with dual aspheric surfaces on a substrate can thus be fabricated by lithography. There are additional steps not mentioned here, which are required to complete the array of aspheric lens structures with dual aspheric surfaces, but which are not essential to an understanding of the invention.

Figure 11:
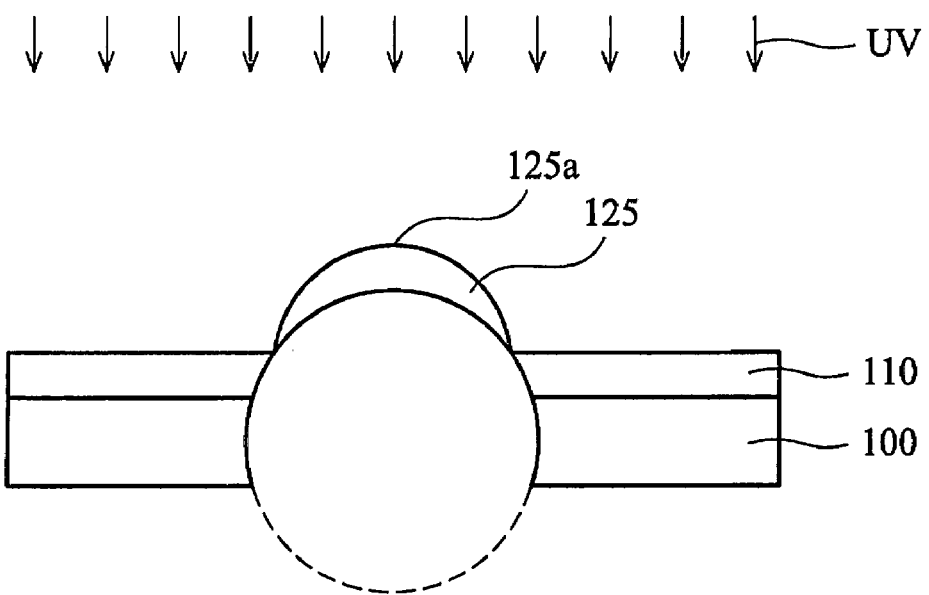
FIGS. 11-12 show cross sections illustrating fabrication of another exemplary embodiment of an aspheric lens structure with dual aspheric surfaces of the invention.
Figure 12:
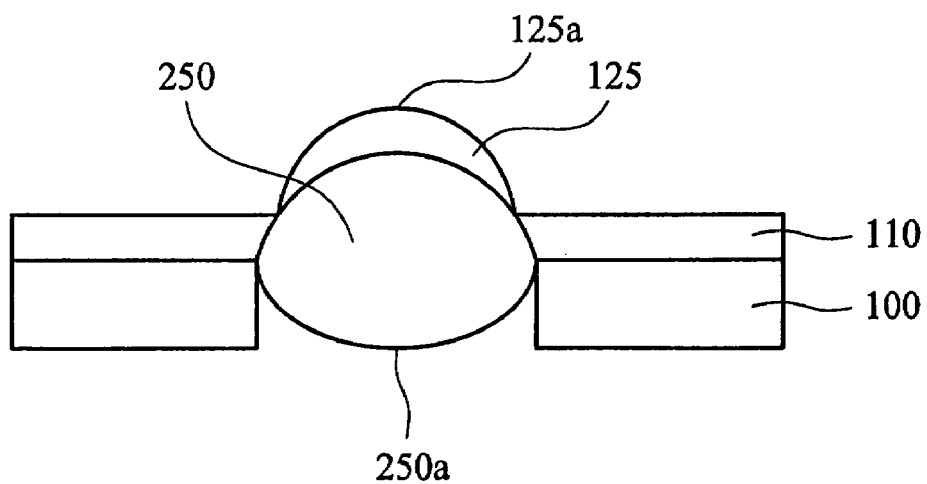

FIGS. 11-12 are cross sections illustrating fabrication of another exemplary embodiment of an aspheric lens structure with dual aspheric surfaces of the invention. Referring to FIG. 11, the ball lens 200 is preferably composed of a UV dissolvable resin. The UV dissolvable ball lens 200 is irradiated by UV light and is removed by chemical solvent leaving a cavity.

Referring to FIG. 12, an alternative second lens component 250 with an aspheric back surface 250a is formed in the cavity. The alternative second lens component 250 can be formed by molding. The radius of curvature of the aspheric top surface 125a of the first lens component 125 is different than the radius of curvature of the aspheric back surface 250a of the alternative second lens component 250. Other steps not shown are undertaken to complete the aspheric lens structures with dual aspheric surfaces.

The invention is advantageous in that aspheric lens structures with dual aspheric surfaces on a plate are fabricated by lithography. The radius of curvature and surface profile of the aspheric lens structure can be precisely adjusted and controlled. The ability to mass produce aspheric lens structure arrays with dual aspheric surfaces on a plate can be achieved for wafer scale packaging. Optic performance, in comparison with conventional single aspheric surface lens plates, can also be improved.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An aspheric lens structure, comprising:
   a first lens component with an aspheric top surface disposed on a second lens component, wherein the interface between the first lens component and the second lens component is spherical;
   a substrate configured as a carrier on which the aspheric lens structure is formed,
     the substrate carrying an array of the aspheric lens structures; and a layer of black dye disposed on the substrate as a buffer of the aspheric lens structure.

2. The aspheric lens structure according to claim 1, wherein the second lens component comprises a spherical back surface.

3. The aspheric lens structure according to claim 1, wherein the second lens component comprises an aspheric back surface.

4. The aspheric lens structure according to claim 3, wherein the radius of curvature of the aspheric top surface of the first lens component is different than the radius of curvature of the aspheric back surface of the second lens component.

5. The aspheric lens structure according to claim 1, wherein the second lens component comprises a planar back surface and a third lens component is disposed on the planar back surface of the second component.

6. The aspheric lens structure according to claim 5, wherein the third lens component comprises an aspheric back surface.

7. The aspheric lens structure according to claim 6, wherein the radius of curvature of the aspheric top surface of the first lens component is different than the radius of curvature of the aspheric back surface of the third lens component.

8. A method for fabricating an aspheric lens structure, comprising:
   providing a substrate;
   perforating a hole through the substrate;
   inserting a ball lens in the hole exposing a pre-curvature of the ball lens;
   applying a layer of black dye on the substrate to obstruct an unnecessary part of the ball lens;
   conformably forming a photoresist layer on the substrate and the exposed ball lens; and
   forming the photoresist layer by lithography to create an aspheric surface of the photoresist layer on the ball lens configured as a first lens component.

9. The method for fabricating an aspheric lens structure according to claim 8, further comprising:
   polishing back of the ball lens to create a planar back surface configured as a second lens component; and
   forming a third lens component with an aspheric back surface on the planar back surface of the second component.

10. The method for fabricating an aspheric lens structure according to claim 9, wherein the third lens component is formed by molding.

11. The method for fabricating an aspheric lens structure according to claim 9, wherein the radius of curvature of the aspheric top surface of the first lens component is different than the radius of curvature of the aspheric back surface of the third lens component.

12. The method for fabricating an aspheric lens structure according to claim 9, wherein the radius of curvature of the aspheric top surface of the first lens component is different than the radius of curvature of the aspheric back surface of the third lens component.

13. The method for fabricating an aspheric lens structure according to claim 8, further comprising:

removing the ball lens creating a cavity; and forming a second lens component with an aspheric back surface in the cavity.

14. The method for fabricating an aspheric lens structure according to claim 13, wherein the second lens component is formed by molding.

15. The method for fabricating an aspheric lens structure according to claim 8, wherein the step of forming the photoresist layer by lithography is performed by a phase transition mask lithography.

16. The method for fabricating an aspheric lens structure according to claim 8, further comprising a step of reflowing to change the curvature of the aspheric surface of the photoresist layer.

17. The method for fabricating an aspheric lens structure according to claim 8, further comprising a step of molding to change the curvature of the aspheric surface of the photoresist layer.

* * * * *